(12) United States Patent
Arai et al.

(10) Patent No.: US 8,735,019 B2
(45) Date of Patent: May 27, 2014

(54) FUEL CELL

(75) Inventors: Tatsuya Arai, Toyota (JP); Naoki Takehiro, Toyota (JP); Atsuo Iio, Toyota (JP); Koshi Sekizawa, Toyoto (JP); Hiroko Kimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/637,255

(22) PCT Filed: Apr. 7, 2010

(86) PCT No.: PCT/JP2010/056334
§ 371 (c)(1),
(2), (4) Date: Oct. 5, 2012

(87) PCT Pub. No.: WO2011/125196
PCT Pub. Date: Oct. 13, 2011

(65) Prior Publication Data
US 2013/0029248 A1    Jan. 31, 2013

(51) Int. Cl.
*H01M 4/92* (2006.01)
(52) U.S. Cl.
CPC ................................. *H01M 4/92* (2013.01)
USPC ..................... 429/483; 429/524; 429/525
(58) Field of Classification Search
None
See application file for complete search history.

(56) References Cited

U.S. PATENT DOCUMENTS

| 2007/0031722 A1 | 2/2007 | Adzic et al. |
| 2009/0130515 A1 | 5/2009 | Son et al. |
| 2009/0239116 A1* | 9/2009 | Okumura et al. ............... 429/30 |
| 2010/0086832 A1 | 4/2010 | Lopez et al. |

FOREIGN PATENT DOCUMENTS

| JP | A-2005-190726 | 7/2005 |
| JP | A-2008-123985 | 5/2008 |
| JP | A-2008-153192 | 7/2008 |
| JP | A-2010-501344 | 1/2010 |

OTHER PUBLICATIONS

Norimatsu et al., "Shape-and size-controlled synthesis of Pd nanoparticle catalysts using Tetranuclear Pd complex as Precursor", *Shokubai 97th CATSJ Meeting Abstracts*, 2006, pp. 129-131, vol. 48, No. 2, Japan (with partial translation).
International Search Report issued in International Application No. PCT/JP2010/056334 dated Jul. 20, 2010 (with translation).

* cited by examiner

*Primary Examiner* — Milton I Cano
*Assistant Examiner* — Wojciech Haske
(74) *Attorney, Agent, or Firm* — Oliff PLC

(57) ABSTRACT

A fuel cell including a single fuel cell which includes a membrane electrode including a polymer electrolyte membrane, an anode electrode on one surface of the polymer electrolyte membrane, and a cathode electrode on another surface of the polymer electrolyte membrane, the anode electrode including an anode catalyst layer and a gas diffusion layer and the cathode electrode including a cathode catalyst layer and a gas diffusion layer. At least one of the anode cathode catalyst layers includes core-shell type catalyst particles, each having a core and a shell covering the core and including a shell metallic material. At least one of the polymer electrolyte membrane, anode catalyst layer, gas diffusion layer at the anode side, cathode catalyst layer and gas diffusion layer at the cathode side includes metallic nanoparticles having an average particle diameter different from that of the core-shell type catalyst particles and including the shell metallic material.

9 Claims, 3 Drawing Sheets

FUEL CELL

TECHNICAL FIELD

The present invention relates to a fuel cell which comprises an electrocatalyst layer containing core-shell type catalyst particles and is capable of maintaining high catalyst activity of the core-shell type catalyst particles.

BACKGROUND ART

A fuel cell converts chemical energy directly to electrical energy by supplying a fuel and an oxidant to two electrically-connected electrodes and causing electrochemical oxidation of the fuel. Unlike thermal power generation, fuel cells are not limited by Carnot cycle, so that they can show high energy conversion efficiency. In general, a fuel cell is formed by stacking a plurality of single fuel cells each of which has a membrane electrode assembly as a fundamental structure, in which an electrolyte membrane is sandwiched between a pair of electrodes. Especially, a solid polymer electrolyte fuel cell which uses a solid polymer electrolyte membrane as the electrolyte membrane is attracting attention as a portable and mobile power source because it has such advantages that it can be downsized easily, operate at low temperature, etc.

In a solid polymer electrolyte fuel cell, the reaction represented by the following formula (I) proceeds at an anode (fuel electrode) in the case of using hydrogen as fuel:

$$H_2 \rightarrow 2H^+ + 2e^- \qquad \text{Formula (I)}$$

Electrons generated by the reaction represented by the formula (I) pass through an external circuit, work by an external load, and then reach a cathode (oxidant electrode). Protons generated by the reaction represented by the formula (I) are, in the state of being hydrated and by electro-osmosis, transferred from the anode side to the cathode side through the solid polymer electrolyte membrane.

In the case of using oxygen as an oxidant, the reaction represented by the following formula (II) proceeds at the cathode:

$$2H^+ + (\tfrac{1}{2})O_2 + 2e^- \rightarrow H_2O \qquad \text{Formula (II)}$$

Water produced at the cathode passes mainly through a gas diffusion layer and is discharged to the outside. Accordingly, fuel cells are clean power source that produces no emissions except water.

In the fuel cell, a decrease in voltage attributed to overvoltage is one of major causes of decreasing output. Examples of the overvoltage include activation overvoltage derived from an electrode reaction, resistance overvoltage derived from the resistance on an electrode surface or the resistance of the fuel cell, and concentration overvoltage derived from concentration distribution of the reactant on the electrode surface. The electrocatalyst exerts the effect of decreasing activation overvoltage among the above-mentioned overvoltages.

Platinum and a platinum alloy are preferably used as the electrocatalyst in the cathode and anode of the fuel cell because the platinum has high catalytic performance. However, slow reaction rate of oxygen reduction in the cathode using the conventional platinum catalyst and high platinum cost cause a significant barrier to the commercialization of fuel cells. As the catalyst for solving such a problem, a particle composite containing palladium or a palladium alloy covered with an atomic thin layer of a platinum atom is disclosed in Patent Literature 1.

CITATION LIST

Patent Literature

[Patent Literature 1] US Patent Publication No. 2007/31722

SUMMARY OF INVENTION

Technical Problem

Paragraph 236 and the following paragraphs of Patent Literature 1 disclose experimental examples of a palladium particle covered with platinum. However, there is a possibility that, in a particle composite of such an embodiment, when platinum being a covering material is eluted in an electrode reaction process, palladium which can be core is promptly dissolved, resulting in a rapid decrease in the catalytic performance of the whole of the particle composite.

The present invention has been made in view of the above circumstances, and it is an object of the present invention to provide a fuel cell which comprises an electrocatalyst layer containing core-shell type catalyst particles and is capable of maintaining high catalyst activity of the core-shell type catalyst particles.

Solution to Problem

The fuel cell of the present invention comprises a single fuel cell which comprises a membrane electrode assembly comprising a polymer electrolyte membrane, an anode electrode on one surface of the polymer electrolyte membrane, and a cathode electrode on the other surface of the polymer electrolyte membrane, the anode electrode comprising an anode catalyst layer and a gas diffusion layer and the cathode electrode comprising a cathode catalyst layer and a gas diffusion layer, wherein at least one of the anode catalyst layer and the cathode catalyst layer comprises core-shell type catalyst particles, each of which has a core portion and a shell portion covering the core portion and comprising a shell metallic material; and wherein at least one of the polymer electrolyte membrane, the anode catalyst layer, the gas diffusion layer at the anode side, the cathode catalyst layer and the gas diffusion layer at the cathode side comprises metallic nanoparticles having an average particle diameter which is different from that of the core-shell type catalyst particles and comprising the shell metallic material.

The fuel cell of such a structure comprises the metallic nanoparticles having an average particle diameter which is different from that of the core-shell type catalyst particles. Therefore, in accordance with Ostwald ripening, the metallic nanoparticles are more likely to be eluted than the shell portion of the core-shell type catalyst particles, or the shell metallic material is more likely to be precipitated on the surface of the metallic nanoparticles than that of the core-shell type catalyst particles, thereby maintaining the shell structure of the core-shell type catalyst particles and keeping high catalyst activity of the core-shell type catalyst particles.

As an embodiment of the fuel cell of the present invention, the metallic nanoparticles have an average particle diameter which is smaller than that of the core-shell type catalyst particles.

The fuel cell of such a structure comprises the metallic nanoparticles having an average particle diameter which is smaller than that of the core-shell type catalyst particles. Therefore, in accordance with Ostwald ripening, the metallic nanoparticles are more likely to be eluted than the shell portion of the core-shell type catalyst particles, and thus the dissolution rate of the shell portion of the core-shell type catalyst particles decreases. Thereby, it is possible to prevent the destruction of the core-shell type catalyst particles and thus to inhibit a decrease in activity of the core-shell type catalyst particles. Also, in the fuel cell of such a structure, the metallic nanoparticles are dissolved to increase the ion concentration of the shell metallic material around the core-shell type catalyst particles, thereby further decreasing the dissolution rate of the shell portion of the core-shell type catalyst particles due to the equilibrium of the concentration in the electrode.

As an embodiment of the fuel cell of the present invention, the shell metallic material is platinum, and, at potential E, average particle diameter $R_1$ of the core-shell type catalyst particles and average particle diameter $R_2$ of the metallic nanoparticles are determined so that reaction rate $r_1$ represented by the following formula (1) and reaction rate $r_2$ represented by the following formula (2) meet the relationship represented by the following formula (3):

$$r_1 = k_1 \theta_{vac}\left[\exp\left\{\frac{\alpha_{a,1} n_1 F}{RT}\left(E - U_1^\theta + \frac{\sigma_{Pt} M_{Pt}}{F \rho_{Pt}} \frac{1}{R_1}\right)\right\} - \right. \qquad \text{Formula (1)}$$
$$\left. (C_{Pt^{2+}} \cdot 10^3) \exp\left\{-\frac{\alpha_{c,1} n_1 F}{RT}\left(E - U_1^\theta + \frac{\sigma_{Pt} M_{Pt}}{F \rho_{Pt}} \frac{1}{R_1}\right)\right\}\right]$$

$$r_2 = k_1 \theta_{vac}\left[\exp\left\{\frac{\alpha_{a,1} n_1 F}{RT}\left(E - U_1^\theta + \frac{\sigma_{Pt} M_{Pt}}{F \rho_{Pt}} \frac{1}{R_2}\right)\right\} - \right. \qquad \text{Formula (2)}$$
$$\left. (C_{Pt^{2+}} \cdot 10^3) \exp\left\{-\frac{\alpha_{c,1} n_1 F}{RT}\left(E - U_1^\theta + \frac{\sigma_{Pt} M_{Pt}}{F \rho_{Pt}} \frac{1}{R_2}\right)\right\}\right]$$

$$r_2/r_1 > 1 \qquad \text{Formula (3)}$$

wherein, in the formulae (1) and (2),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_2$ is an average particle diameter (cm) of the metallic nanoparticles;
$C_{Pt^{2+}}$ is a platinum ion concentration (mol·L$^{-1}$); and
$\alpha_{c,1}$ is the transfer coefficient in reduction direction of a platinum dissolution reaction.

As an embodiment of the fuel cell of the present invention, the metallic nanoparticles have an average particle diameter which is larger than that of the core-shell type catalyst particles.

The fuel cell of such a structure comprises the metallic nanoparticles having an average particle diameter which is larger than that of the core-shell type catalyst particles. Therefore, in accordance with Ostwald ripening, the shell metallic material is more likely to be precipitated on the surface of the metallic nanoparticles than that of the core-shell type catalyst particles, and thus the precipitation rate of the shell metallic material on the surface of the core-shell type catalyst particles decreases. Thereby, it is possible to prevent an increase in thickness of the shell portion of the core-shell type catalyst particles and thus to inhibit a decrease in activity of the core-shell type catalyst particles.

As an embodiment of the fuel cell of the present invention, the shell metallic material is contained only in the surface of the metallic nanoparticles.

The fuel cell of such a structure can reduce the cost of the shell metallic material.

As an embodiment of the fuel cell of the present invention, the shell metallic material is platinum, and, at potential E, average particle diameter $R_1$ of the core-shell type catalyst particles and average particle diameter $R_3$ of the metallic nanoparticles are determined so that reaction rate $r_1$ represented by the following formula (1) and reaction rate $r_3$ represented by the following formula (4) meet the relationship represented by the following formula (5):

$$r_1 = k_1 \theta_{vac}\left[\exp\left\{\frac{\alpha_{a,1} n_1 F}{RT}\left(E - U_1^\theta + \frac{\sigma_{Pt} M_{Pt}}{F \rho_{Pt}} \frac{1}{R_1}\right)\right\} - \right. \qquad \text{Formula (1)}$$
$$\left. (C_{Pt^{2+}} \cdot 10^3) \exp\left\{-\frac{\alpha_{c,1} n_1 F}{RT}\left(E - U_1^\theta + \frac{\sigma_{Pt} M_{Pt}}{F \rho_{Pt}} \frac{1}{R_1}\right)\right\}\right]$$

$$r_3 = k_1 \theta_{vac}\left[\exp\left\{\frac{\alpha_{a,1} n_1 F}{RT}\left(E - U_1^\theta + \frac{\sigma_{Pt} M_{Pt}}{F \rho_{Pt}} \frac{1}{R_3}\right)\right\} - \right. \qquad \text{Formula (4)}$$
$$\left. (C_{Pt^{2+}} \cdot 10^3) \exp\left\{-\frac{\alpha_{c,1} n_1 F}{RT}\left(E - U_1^\theta + \frac{\sigma_{Pt} M_{Pt}}{F \rho_{Pt}} \frac{1}{R_3}\right)\right\}\right]$$

$$r_1/r_3 < 1 \qquad \text{Formula (5)}$$

wherein, in the formulae (1) and (4),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_3$ is an average particle diameter (cm) of the metallic nanoparticles;
$C_{Pt^{2+}}$ is a platinum ion concentration (mol·L$^{-1}$); and
$\alpha_{c,1}$ is the transfer coefficient in reduction direction of a platinum dissolution reaction.

As an embodiment of the fuel cell of the present invention, the metallic nanoparticles are two or more kinds of metallic nanoparticles, and, among the different kinds of metallic nanoparticles, a first kind of metallic nanoparticles have an average particle diameter which is smaller than that of the core-shell type catalyst particles, and a second kind of metallic nanoparticles have an average particle diameter which is larger than that of the core-shell type catalyst particles.

In the fuel cell of such a structure, it is possible to inhibit the elution of the shell portion of the core-shell type catalyst particles by dissolving the first kind of metallic nanoparticles; while, it is possible to prevent an increase in thickness of the shell portion of the core-shell type catalyst particles by precipitating the dissolved components of the first kind of metallic nanoparticles on the surface of the second kind of metallic nanoparticles, thereby balancing durability with catalyst activity of the core-shell type catalyst particles.

As an embodiment of the fuel cell of the present invention, the shell metallic material is contained only in the surface of the second kind of metallic nanoparticles.

As an embodiment of the fuel cell of the present invention, the shell metallic material is platinum, and, at potential E, average particle diameter $R_1$ of the core-shell type catalyst particles and average particle diameter $R_2$ of the first kind of metallic nanoparticles are determined so that reaction rate $r_1$ represented by the following formula (1) and reaction rate $r_2$ represented by the following formula (2) meet the relationship represented by the following formula (3), and average particle diameter $R_1$ of the core-shell type catalyst particles and average particle diameter $R_3$ of the second kind of metallic nanoparticles are determined so that reaction rate $r_1$ represented by the following formula (1) and reaction rate $r_3$ represented by the following formula (4) meet the relationship represented by the following formula (5):

$$r_1 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_1} \right) \right\} - (C_{Pt2+} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_1} \right) \right\} \right]$$ Formula (1)

$$r_2 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_2} \right) \right\} - (C_{Pt2+} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_2} \right) \right\} \right]$$ Formula (2)

$$r_2/r_1 > 1$$ Formula (3)

$$r_3 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_3} \right) \right\} - (C_{Pt2+} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_3} \right) \right\} \right]$$ Formula (4)

$$r_1/r_3 < 1$$ Formula (5)

wherein, in the formulae (1), (2) and (4),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_2$ is an average particle diameter (cm) of the first kind of metallic nanoparticles;
$R_3$ is an average particle diameter (cm) of the second kind of metallic nanoparticles;
$C_{Pt2+}$ is a platinum ion concentration (mol·L$^{-1}$); and
$\alpha_{c,1}$ is the transfer coefficient in reduction direction of a platinum dissolution reaction.

Advantageous Effects of Invention

The present invention comprises the metallic nanoparticles having an average particle diameter which is different from that of the core-shell type catalyst particles. Therefore, in accordance with Ostwald ripening, the metallic nanoparticles are more likely to be eluted than the shell portion of the core-shell type catalyst particles, or the shell metallic material is more likely to be precipitated on the surface of the metallic nanoparticles than that of the core-shell type catalyst particles, thereby maintaining the shell structure of the core-shell type catalyst particles and keeping high catalyst activity of the core-shell type catalyst particles.

DESCRIPTION OF EMBODIMENTS

Figure 1:
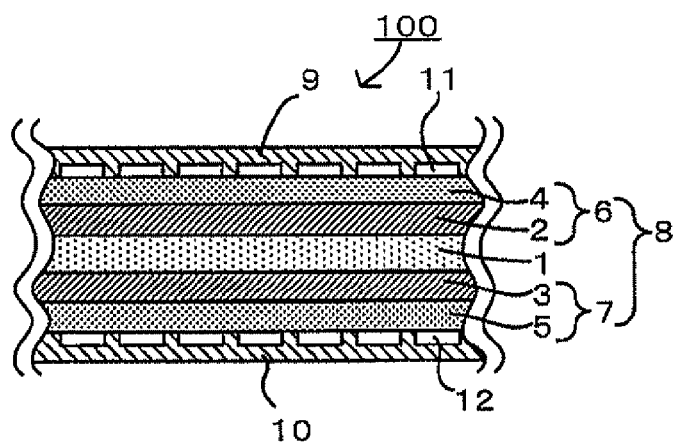
FIG. 1 is a view showing an example of the fuel cell of the present invention, and is also a view schematically showing a cross section of the same in its layer stacking direction.

The fuel cell of the present invention comprises a single fuel cell which comprises a membrane electrode assembly comprising a polymer electrolyte membrane, an anode electrode on one surface of the polymer electrolyte membrane, and a cathode electrode on the other surface of the polymer electrolyte membrane, the anode electrode comprising an anode catalyst layer and a gas diffusion layer and the cathode electrode comprising a cathode catalyst layer and a gas diffusion layer, wherein at least one of the anode catalyst layer and the cathode catalyst layer comprises core-shell type catalyst particles, each of which has a core portion and a shell portion covering the core portion and comprising a shell metallic material; and wherein at least one of the polymer electrolyte membrane, the anode catalyst layer, the gas diffusion layer at the anode side, the cathode catalyst layer and the gas diffusion layer at the cathode side comprises metallic nanoparticles having an average particle diameter which is different from that of the core-shell type catalyst particles and comprising the shell metallic material.

As described above, conventionally, metals having high catalyst activity have been employed as the electrocatalyst for fuel cells, such as platinum and the like. However, despite the fact that platinum and the like are very expensive, catalysis takes place only on the surface of platinum particles, and the inside of the particles rarely participates in catalysis. Therefore, the catalyst activity of the platinum catalyst is not necessarily high, relative to its material cost.

To overcome such an issue, the inventors of the present invention have focused attention on a core-shell type catalyst comprising a core portion and a shell portion covering the core portion. In the core-shell type catalyst, the inside of the particles, which rarely participates in catalysis, can be formed at a low cost by using a relatively inexpensive material for the core portion. Also, such a catalyst is advantageous to exhibit higher catalyst activity by using a material having high catalyst activity for the shell portion, compared with the case where the material is used in bulk.

The core-shell type catalyst has such a unique problem that once part of the shell portion is eluted to render the shell portion defective, even the core portion is also eluted to destroy the core-shell structure, resulting in a rapid decrease in the catalyst activity of the whole of the core-shell type catalyst. This problem occurs very often particularly when a standard electrode potential of the material used for the core portion is lower than that of the material used for the shell portion. It is possible to improve a problem with durability by using a core-shell type catalyst having a thick shell portion; however, such a core-shell type catalyst has low activity.

In the core-shell type catalyst, as in the case of the conventional platinum catalyst, particles having a relatively small particle diameter are dissolved and particles having a relatively large particle diameter grow, in accordance with Ostwald ripening. Such a phenomenon always occurs whenever particles differ in particle diameter are present together, regardless of a particle size. In the case of the core-shell type catalyst, a decrease in catalyst activity is caused not only by simply dissolving the catalyst particles but also by facilitating the growth of other kinds of catalyst particles by the eluted ion.

As a result of diligent efforts, the inventors of the present invention have found that the core-shell type catalyst particles and the metallic nanoparticles having an average particle diameter which is different from that of the core-shell type catalyst particles are used in combination, thereby balancing durability with catalyst activity. Thus, the inventors have achieved the present invention.

The average particle diameter of the particles in the present invention is calculated by the conventional method. An example of the method of calculating the average particle diameter of the particles is as follows. Firstly, the particle diameter of one particle is calculated in a TEM (transmission electron microscope) image at a magnification of 400,000 or 1,000,000 when the particle is regarded as a spherical particle. Such a calculation of the particle diameter by the TEM observation is performed on the same kinds of 200 to 300 particles to define the average of these particles as the average particle diameter.

Hereinafter, the core-shell type catalyst particles used in the present invention will be described. Then, there will be described in order the metallic nanoparticles having an average particle diameter which is smaller than that of the core-shell type catalyst particles, the metallic nanoparticles having an average particle diameter which is larger than that of the core-shell type catalyst particles, and other constitutions of the fuel cell.

1. Core-Shell Type Catalyst Particles

By employing the core-shell type catalyst particles in the present invention, as described above, there can be obtained two effects, including high catalyst activity in the shell portion and cost reduction by the employment of the core-shell structure.

In the core-shell type catalyst particles used in the present invention, the shell portion covering the core portion is preferably a monatomic layer. Such particles are advantageous in that the catalytic performance of the shell portion is extremely high and the material cost is low because the covering amount of the shell portion is small, compared with a core-shell type catalyst having a shell portion comprising two or more atomic layers.

An optimum average particle diameter of the core-shell type catalyst particles used in the present invention will be described.

Figure 2:
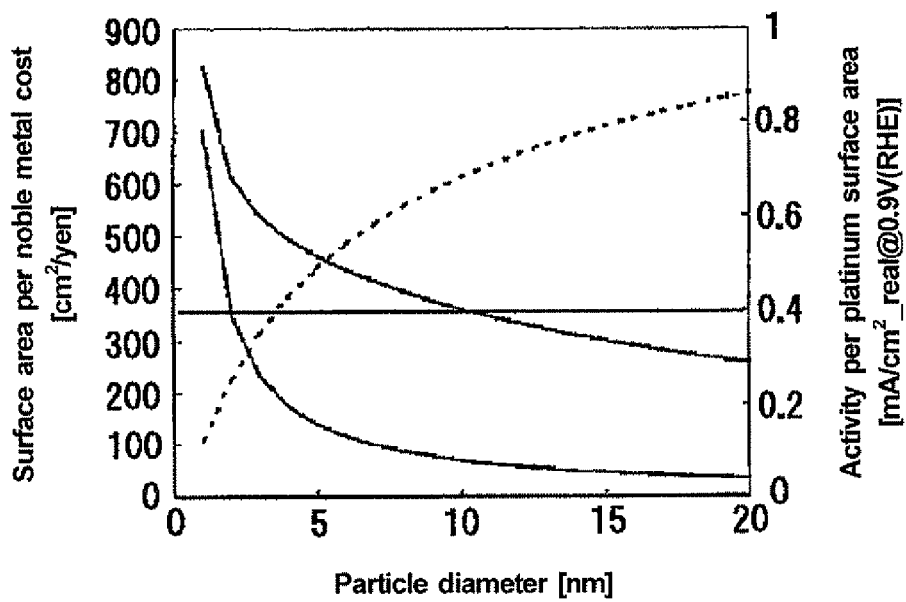
FIG. 2 is a graph showing a correlation between surface area or catalyst activity per noble metal cost, and catalyst particle diameter.

A dashed line graph in FIG. 2 shows a correlation between catalyst activity and catalyst particle diameter of platinum-supported carbon (hereinafter referred to as Pt/C) catalyst particles, and it is also a graph with activity per platinum surface area ($mA/cm^2$) on the vertical axis and particle diameter (nm) on the horizontal axis. As shown in FIG. 2, the larger the catalyst particle diameter, the higher the catalyst activity; however, the larger the catalyst particle diameter, the smaller the rate of increase in the catalyst activity.

Two solid line graphs in FIG. 2 show a correlation between surface area per noble metal cost and catalyst particle diameter, and they are also graphs with the surface area per noble metal cost ($cm^2$/yen) on the vertical axis and the particle diameter (nm) on the horizontal axis. Among the above graphs, the lower graph shows a correlation between surface area per noble metal cost and catalyst particle diameter of a Pt/C catalyst particle and the upper graph shows a correlation between surface area per noble metal cost and catalyst particle diameter of a core-shell type catalyst particle. The core-shell type catalyst particle in FIG. 2 is a catalyst particle using a palladium-copper alloy (Pd:Cu=1:1 at a molar ratio) for the core portion and platinum (1 mL) for the shell portion, and further being supported by a carbon. The graphs in FIG. 2 show results calculated without taking copper cost and production cost.

As shown in FIG. 2, both the core-shell type catalyst particle and the Pt/C catalyst particle have lower surface area per noble metal cost as they have larger particle diameter. In addition, the core-shell type catalyst particle has lower rate of decrease in the surface area per noble metal cost, which is associated with the increase in the particle diameter, compared with the Pt/C catalyst particle. Further, the surface area per noble metal cost of the core-shell type catalyst particle is larger than that of the Pt/C catalyst particle in any particle diameter. These results show that the core-shell type catalyst particle has a larger surface area per noble metal cost, and is relatively less likely to be affected by the increase in particle diameter, compared with the Pt/C catalyst particle.

A straight line shown in FIG. 2, with activity per platinum surface area (0.4 $mA/cm^2$) and surface area per noble metal cost (350 $cm^2$/yen), represents a target line determined by catalyst layer diffuseness when the catalyst per unit area is 0.1 $mg/cm^2$ and gas diffusion resistance of the catalyst layer is less than 30 S/m. That is, by selecting the particle diameter corresponding to the dashed line graph and the solid line graph above the target line, the catalyst having low noble metal cost and high catalyst activity can be obtained.

First, a Pt/C catalyst particle will be studied. The target line on the dashed line graph showing the activity per platinum surface area is located at a particle diameter of 4 nm or more. On the other hand, the target line on the solid line graph showing the surface area per noble metal cost of the Pt/C catalyst particle is located at a particle diameter of 2 nm or less. Therefore, the Pt/C catalyst particle cannot achieve low noble metal cost and high catalyst activity at the same time.

Next, a core-shell type catalyst particle will be studied. The dashed line graph is also applied to the core-shell type catalyst particle. As described above, the target line on the dashed line graph showing the activity per platinum surface area is located at a particle diameter of 4 nm or more. On the other hand, the target line on the solid line graph showing the surface area per noble metal cost of the core-shell type catalyst particle is located at a particle diameter of 10 nm or less. Therefore, the core-shell type catalyst particle having a particle diameter of 4 to 10 nm can achieve low noble metal cost and high catalyst activity at the same time.

Figure 3:
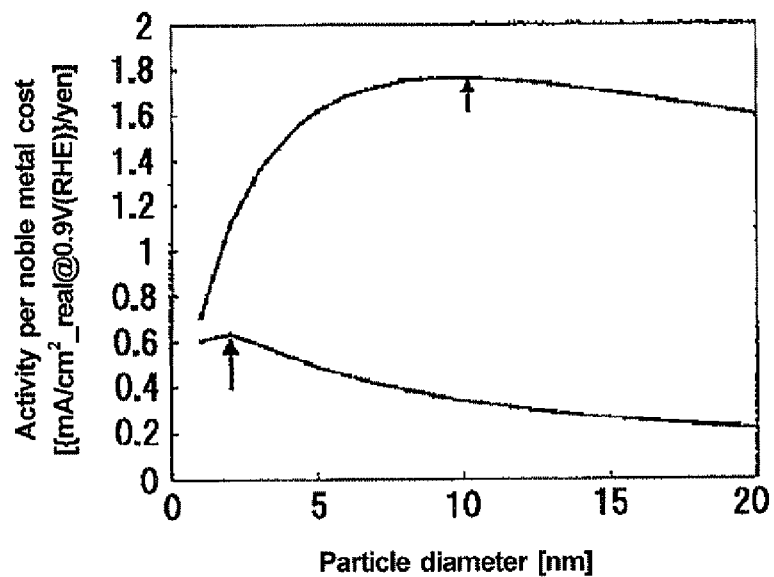
FIG. 3 is a graph showing a correlation between catalyst activity and catalyst particle diameter.

Two graphs in FIG. 3 show a correlation between catalyst activity and catalyst particle diameter, and they are also graphs with the activity per noble metal cost ($mA/(cm^2 \cdot yen)$) on the vertical axis and the particle diameter (nm) on the horizontal axis. Among the above graphs, the lower graph shows a correlation between catalyst activity and catalyst particle diameter of a Pt/C catalyst particle, and the upper graph shows a correlation between catalyst activity and catalyst particle diameter of a core-shell type catalyst particle. The core-shell type catalyst particle in FIG. 3 is the same as that in FIG. 2. Also, the noble metal cost is calculated based on platinum which costs at 4,000 yen/g and palladium which costs at 730 yen/g.

As shown by arrows in FIG. 3, the maximum value of the activity per noble metal cost of the Pt/C catalyst particle is 0.6 $mA/(cm^2 \cdot yen)$, when the particle diameter is 2 nm. On the other hand, the maximum value of the activity per noble metal cost of the core-shell type catalyst particle is 1.8 $mA/(cm^2 \cdot yen)$, when the particle diameter is 10 nm. Therefore, the maximum value of the activity per noble metal cost of the core-shell type catalyst particle is three time higher than that of the Pt/C catalyst particle.

From the viewpoint of the above-mentioned catalyst activity and cost, the core-shell type catalyst particle preferably has a diameter of 4 to 10 nm.

Figure 4:
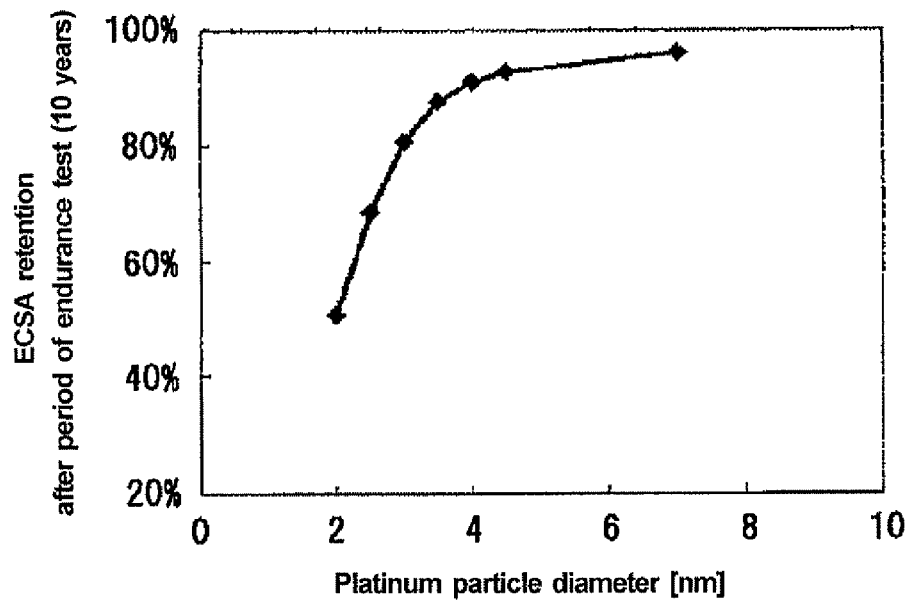
FIG. 4 is a graph showing a simulation result of a correlation between catalyst particle diameter and ECSA retention.

A graph in FIG. 4 shows a simulation result of a correlation between catalyst particle diameter and Electrochemical Surface Area (hereinafter, it may be referred to as ECSA) retention, and it is also a graph with the ECSA retention (%) after the period of endurance test on the vertical axis and the particle diameter (nm) on the horizontal axis. The period of endurance test is 10 years. The catalytic amount is calculated as containing 0.1 mg of platinum per 1 $cm^2$ of a membrane electrode assembly.

As shown in FIG. 4, the larger the catalyst particle diameter, the higher the ECSA retention; however, the larger the catalyst particle diameter, the smaller the rate of increase in the ECSA retention.

Figure 5:
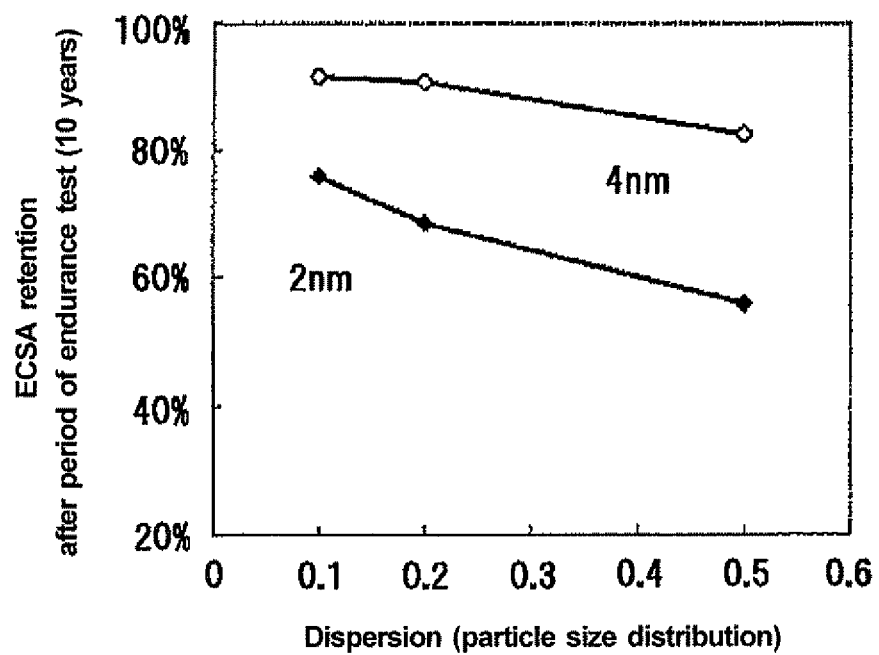
FIG. 5 is a graph showing a simulation result of a correlation between catalyst particle size distribution and ECSA retention.

Two graphs in FIG. 5 show a simulation result of a correlation between particle size distribution and ECSA retention, and they are also graphs with the ECSA retention (%) after the period of endurance test on the vertical axis and the dispersion of the particle size distribution on the horizontal axis. The period of endurance test is 10 years. Also, a white diamond-shaped plot refers to the case where the average particle diameter is 4 nm, and a black diamond-shaped plot refers to the case where the average particle diameter is 2 nm.

As shown in FIG. 5, both in the case where the average particle diameter is 4 nm and 2 nm, the ECSA retention is higher as the dispersion is smaller. Also, the ECSA retention in the case where the average particle diameter is 4 nm is higher than that in the case where the average particle diameter is 2 nm. Therefore, the ECSA retention is higher as the particle size distribution is closer to a single dispersion and the average particle diameter is larger.

In view of the results shown in FIGS. 2 to 5, the core-shell type catalyst particles preferably have an average particle diameter of 6 to 20 nm and a dispersity of 0.1 or less.

Also, considering Ostwald ripening described below, the average particle diameter of the core-shell type catalyst particles used in the present invention is preferably from 6 to 20 nm, particularly preferably from 6 to 10 nm.

From the point of view that it is possible to inhibit the elution of the core portion further, a coverage of the shell portion on the core portion is preferably from 0.8 to 1.

If the coverage of the shell portion on the core portion is less than 0.8, the core portion is eluted by an electrochemical reaction, so that there is a possibility that the core-shell type catalyst particles are deteriorated.

"Coverage of the shell portion on the core portion" means a ratio of the area of the core portion which is covered with the shell portion, with the premise that the total surface area of the core portion is 1. As the method for calculating the coverage, for example, there may be mentioned a method comprising the steps of observing several sites on the surface of the core-shell type catalyst particles by means of a TEM and calculating the ratio of the area of the core portion, which is confirmed by the observation to be covered with the shell portion, to the whole observed area.

Also, it is possible to calculate the coverage of the shell portion on the core portion by investigating components that are present on the outermost surface of the core-shell type catalyst particles by X-ray photoelectron spectroscopy (XPS) or time of flight secondary ion mass spectrometry (TOF-SIMS), etc.

As the core portion, there can be employed a core portion that comprises a metallic crystal having a crystal system that is a cubic system and a lattice constant of a=3.6 to 4.1 Å. Examples of materials which can form such a metallic crystal include metallic materials such as palladium, a palladium-cobalt alloy ($Pd_3Co$), a palladium-copper alloy ($Pd_3Cu$), a palladium-nickel alloy ($Pd_3Ni$). Among them, palladium is preferably used as the core metallic material.

On the other hand, as the shell portion, there can be employed a shell portion that comprises a metallic crystal having a crystal system that is a cubic system and a lattice constant of a=3.7 to 4.3 Å. Examples of materials which can form such a metallic crystal include metallic materials such as platinum, gold, iridium, ruthenium, a platinum-iridium alloy (PtIr) and a platinum-ruthenium alloy (PtRu). Among them, platinum is preferably contained in the shell portion.

By employing both the core metallic material having the lattice constant and the shell portion containing the metallic crystal having the lattice constant, no lattice mismatch occurs between the core and shell portions; therefore, core-shell type catalyst particles can be obtained, which have a high coverage of the shell portion on the core portion.

Each of the core-shell type catalyst particles used in the present invention can be supported by a carrier. Particularly from the viewpoint of imparting electroconductivity to an electrocatalyst layer, the carrier is preferably an electroconductive material.

Specific examples of the electroconductive material which can be used as the carrier include: electroconductive carbon materials including carbon particles such as Ketjen black (product name; manufactured by: Ketjen Black International Company), VULCAN (product name; manufactured by: Cabot Corporation), Norit (product name; manufactured by: Norit Nederland BV), BLACK PEARLS (product name; manufactured by: Cabot Corporation) and Acetylene Black (product name; manufactured by: Chevron Corporation), and carbon fibers; metallic materials such as metallic particles and metallic fibers; and electroconductive oxides.

Next, a method for producing the core-shell type catalyst particles used in the present invention will be described.

The method for producing each of the core-shell type catalyst particles comprises at least the steps of (1) preparing a core particle and (2) covering a core portion by a shell portion. The production method is not necessarily limited to the two steps only, and in addition to the two steps, the method can comprise a filtration/washing step, a drying step, a pulverization step, etc., which will be described below.

Hereinafter, the above steps (1) and (2), and other steps will be described in order.

1-1. Step of Preparing Core Particle

This is a step of preparing a core particle comprising the above-mentioned core metallic material.

A particle can be prepared as the core particle, on which surface a small area of {100}plane of the core metallic material are present. As the method for producing a core particle which selectively has crystal planes other than the {100}face of the core metallic material on the surface thereof, conventionally known methods can be employed.

For example, a reference (Norimatsu, et al., Shokubai, vol. 48 (2), 129 (2006)) and so on disclose a method for producing a palladium particle on which surface Pd{111}planes are selectively present.

As the method for measuring crystal planes on the core particle, for example, there may be mentioned a method for observing several sites on the surface of the core particle by means of a TEM, etc.

As the core particle, the metallic crystal listed above in the description of the core portion can be used. The core particle can be supported by a carrier. Examples of the carrier are the same as the above listed examples.

The average particle diameter of the core particles is not particularly limited as long as it is equal to or less than the average particle diameter of the above mentioned core-shell type catalyst particles.

However, when palladium particles are used as the core particles, the larger the average particle diameter of the palladium particles, the higher the ratio of the area of the Pd{111}plane on the surface of the particles. This is because Pd{111}face is the most chemically stable crystal plane among Pd{111}plane, Pd{110}plane and Pd{100}plane. Therefore, when palladium particles are used as the core particles, it is preferable that the palladium particles have an average particle diameter of 10 to 100 nm. From the point of view that the ratio of the surface area of one palladium particle to the cost per palladium particle is high, it is particularly preferable that the palladium particles have an average particle diameter of 10 to 20 nm.

1-2. Step of Covering Core Portion by Shell Portion

This is a step of covering each of the core particles, which is the core portion, by a shell portion.

The covering of the core portion by the shell portion can be performed through a one-step reaction or multiple-step reaction.

Hereinafter, there will be mainly described an example of the covering of the core portion by the shell portion through a two-step reaction.

As the step of covering the core portion by the shell portion through a two-step reaction, there may be mentioned an example that comprises at least the steps of covering a core particle, which is the core portion, by a monatomic layer and replacing the monatomic layer with the shell portion.

A specific example of the above is a method comprising the steps of preliminarily forming a monatomic layer on the surface of the core portion by underpotential deposition and replacing the monatomic layer with the shell portion. As the underpotential deposition, Cu-UPD is preferably used.

Particularly when palladium particles are used as the core particles and platinum is used for the shell portion, core-shell type catalyst particles with a high platinum coverage and excellent durability can be produced by Cu-UPD. This is because copper can be precipitated on the Pd{111}planes and/or Pd{110}planes by Cu-UPD at a coverage of 1.

Hereinafter, a specific example of Cu-UPD will be described.

First, palladium powder supported by an electroconductive carbon material (hereinafter referred to as Pd/C) is dispersed in water and filtered to obtain a Pd/C paste, and the paste is applied onto a working electrode of an electrochemical cell. For the working electrode, a platinum mesh or glassy carbon can be used.

Next, a copper solution is added to the electrochemical cell. In the copper solution, the working electrode, a reference electrode and a counter electrode are immersed, and a monatomic layer of copper is precipitated on the surface of each of the palladium particles by Cu-UPD. An example of the specific precipitation condition is as follows:

Copper solution: Mixed solution of 0.05 mol/L of $CuSO_4$ and 0.05 mol/L of $H_2SO_4$ (nitrogen is subjected to bubbling)

Atmosphere: under a nitrogen atmosphere

Sweep rate: 0.2 to 0.01 mV/second

Potential: After the potential is swept from 0.8 V (vs RHE) to 0.4 V (vs RHE), it is clamped at 0.4 V (vs RHE).

Voltage clamp time: 5 seconds to 10 minutes

The voltage clamp time is determined by the operating time, and shorter voltage clamp time is preferable. The above-mentioned voltage clamp time from 5 seconds to 10 minutes is limited to the case of μg scale.

After the above voltage clamp time is passed, the working electrode is promptly immersed in a platinum solution to replace copper with platinum by displacement plating, utilizing the difference in ionization tendency. The displacement plating is preferably performed under an inert gas atmosphere such as a nitrogen atmosphere. The platinum solution is not particularly limited. For example, a platinum solution obtained by dissolving $K_2PtCl_4$ in 0.1 mol/L of $HClO_4$ can be used. The platinum solution is sufficiently agitated to bubble nitrogen therein. The length of the displacement plating time is preferably 90 minutes or more.

Core-shell type catalyst particles are obtained by the displacement plating, in which a monatomic layer of platinum is precipitated on the surface each of the palladium particles.

As the material comprising the shell portion, the metallic crystal listed above in the description of the shell portion can be used.

1-3. Other Steps

Before the step of preparing the core particles, each of the core particles can be supported by a carrier. As the method for supporting each of the core particles by a carrier, conventionally used methods can be employed.

After the step of covering the core portion by the shell portion, there may be performed filtration/washing, drying and pulverization of the core-shell type catalyst particles.

The filtration/washing of the core-shell type catalyst particle is not particularly limited as long as it is a method that can remove impurities without damage to the core-shell structure of the particles produced. An example of the filtration/washing includes a method for performing suction and filtration using pure water as a solvent, a filter paper (manufactured by: Whatman; #42), etc. to separate.

The drying of the core-shell type catalyst particles is not particularly limited as long as it is a method that can remove a solvent, etc. An example of the drying is drying for 16 hours with a vacuum drier in the condition of a temperature of 80° C.

The pulverizing of the core-shell type catalyst particles is not particularly limited as long as it is a method that can pulverize solid contents. Examples of the pulverization include pulverization using a mortar, etc., and mechanical milling using a ball mill, a turbo mill, mechanofusion, a disk mill, etc.

2. Metallic Nanoparticles Having an Average Particle Diameter Smaller than that of Core-Shell Type Catalyst Particle The metallic nanoparticles having an average particle diameter smaller than that of the core-shell type catalyst particles mainly function to be dissolved instead of the core-shell type catalyst particles (hereinafter, such metallic nanoparticles are referred to as the first kind of metallic nanoparticles).

As will be described in Examples, Ostwald ripening is considered by adding the first kind of metallic nanoparticles having an average particle diameter which is less than the average particle diameter of the core-shell type catalyst particles, so that the dissolution rate of the first kind of metallic nanoparticles is faster than that of the core-shell type catalyst particles. Therefore, it is possible to prevent the dissolution of the core-shell type catalyst particles and thus to improve the durability of the core-shell type catalyst particles.

As described above, the first kind of metallic nanoparticles are dissolved to increase the ion concentration of the shell metallic material around the core-shell type catalyst particles, thereby further decreasing the dissolution rate of the shell portion of the core-shell type catalyst particles due to the equilibrium of the concentration in the electrode.

When the shell metallic material is platinum, at potential E, average particle diameter $R_1$ of the core-shell type catalyst particles and average particle diameter $R_2$ of the first kind of metallic nanoparticles can be determined so that reaction rate $r_1$ represented by the following formula (1) and reaction rate $r_2$ represented by the following formula (2) meet the relationship represented by the following formula (3).

$$r_1 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_1} \right) \right\} - \right.$$
$$\left. (C_{Pt^{2+}} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_1} \right) \right\} \right]$$ Formula (1)

$$r_2 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_2} \right) \right\} - \right.$$
$$\left. (C_{Pt^{2+}} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_2} \right) \right\} \right]$$ Formula (2)

$$r_2/r_1 > 1$$ Formula (3)

wherein, in the Formula (1) and (2), $k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_2$ is an average particle diameter (cm) of the first kind of metallic nanoparticles;
$C_{Pt^{2+}}$ is platinum ion concentration (mol·L$^{-1}$); and
$\alpha_{c,1}$ is the transfer coefficient in reduction direction of a platinum dissolution reaction.

The above parameters will be simply described.

"$k_1$" is the rate constant of a platinum dissolution reaction (Pt→Pt$^{2+}$+2e$^-$). "$n_1$" is a number of electrons (i.e. "2") involved in the reaction.

"$\theta_{vac}$" is the ratio of a platinum surface which is not covered with oxide, and "0" is input as an initial value. "$\theta_{vac}$" is also the value obtained by subtracting "$\theta_{PtO}$" from 1. "$\theta_{PtO}$" is the ratio of a platinum surface which is covered with oxide, and can be calculated by solving the following differential equation:

$$\frac{d\theta_{PtO}(i, z)}{dt} = \left( \frac{r_2(i, z) - r_3(i, z)}{\Gamma_{max}} \right) - \frac{2\theta_{PtO}(i, z)}{R(i, z)} \cdot \frac{dR(i, z)}{dt}$$ Formula (7)

wherein, in the Formula (7), "$\Gamma_{max}$" is the maximum surface coverage of platinum; "$r_2(i,z)$" is the rate of a platinum oxidation reaction; "$r_3(i,z)$" is the rate of a dissolution reaction of platinum oxide (PtO); and "dR(i,z)/dt" is defined by the following formula (7a):

$$\frac{dR(i, z)}{dt} = -\frac{M_{Pt}}{\rho_{Pt}} (r_1(i, z) + r_2(i, z))$$ Formula (7a)

wherein, in the Formula (7a), "$r_1(i,z)$" is the rate of a platinum dissolution reaction; and "$r_2(i,z)$" is the rate of a platinum oxidation reaction.

"$\alpha_{a,1}$" is the transfer coefficient in oxidation direction of a platinum dissolution reaction, and is varied by parameter fitting. For example, "$\alpha_{a,1}$" can be 0.19. "$\alpha_{c,1}$" is the transfer coefficient in reduction direction of a platinum dissolution reaction, and can be calculated similarly as in "$\alpha_{a,1}$".

"$U_1^\theta$" is the standard thermodynamic potential of a platinum dissolution reaction, and is varied by parameter fitting. For example, "$U_1^\theta$" can be 1.178.

The above Formula (1) is a formula regarding reaction rate $r_1$ of the core-shell type catalyst particles having an average particle diameter $R_1$. On the other hand, the above Formula (2) is a formula regarding reaction rate $r_2$ of the first kind of metallic nanoparticles having an average particle diameter $R_2$.

Each of square brackets in the Formulae (1) and (2) comprises the first term which is an exponential function to base "e", and the second term which is the product of an exponential function to base "e", similarly as in the above exponential function, and platinum ion concentration. The first term contributes to the dissolution, and the exponential function to base "e" in the second term contributes to the precipitation. As will be described in Examples, the exponential function to base "e" in the second term can be a negligible value compared with the first term, at an open circuit voltage (hereinafter referred to as OCV) having a problem with the dissolution. Therefore, both reaction rates $r_1$ and $r_2$ represented by the Formulae (1) and (2) can be positive values.

It is preferable that $r_1$ in the Formula (1) and $r_2$ in the Formula (2) meet the relationship of the above Formula (3), that is, dissolution rate $r_2$ of the first kind of metallic nanoparticles is higher than dissolution rate $r_1$ of the core-shell type catalyst particles, since the dissolution of the first kind of metallic nanoparticles proceeds more rapidly than that of the core-shell type catalyst particles.

The first kind of metallic nanoparticles comprise a shell metallic material. If the shell metallic material is platinum, the first kind of metallic nanoparticles are preferably platinum-supported carbons. Examples of the platinum-supported carbons include TEC10E50E, TEC10V30E and TEC10E40E (they are manufactured by TANAKA KIKINZOKU KOGYO K.K.) as commercial products.

From the viewpoint of the above-mentioned simulation result (FIG. 4) of the correlation between the catalyst particle diameter and the ECSA retention, the content of the first kind of metallic nanoparticles can be determined as described below. In particular, FIG. 4 shows that if the platinum-supported carbons having a particle diameter of 1 nm are contained at a ratio of 0.1 mg/cm$^2$, the ECSA retention is kept at 20% even after 10 years passed. Therefore, it is enough to add the first kind of metallic nanoparticles, for example, at a ratio of 0.08 mg/cm$^2$ if the platinum-supported carbons have a particle diameter of 1 nm or at a ratio of 0.05 mg/cm$^2$ if the platinum-supported carbons have a particle diameter of 2 nm.

From the results of Examples described below, the content of the first kind of metallic nanoparticles can be determined as described below. Hereinafter, there will be studied the case where the durability of the core-shell type catalyst particles is required to be doubled.

For example, if the core-shell type catalyst particles having an average particle diameter of 10 nm and the first kind of metallic nanoparticles having an average particle diameter of 2 nm are used, it is only necessary to add one-eighteenth the amount of the first kind of metallic nanoparticles having an average particle diameter of 2 nm, with respect to the added amount of the core-shell type catalyst particles having an average particle diameter of 10 nm.

On the other hand, for example, if the core-shell type catalyst particles having an average particle diameter of 8 nm and the first kind of metallic nanoparticles having an average particle diameter of 2 nm are used, it is only necessary to add one-fifteenth the amount of the first kind of metallic nanoparticles having an average particle diameter of 2 nm, with respect to the added amount of the core-shell type catalyst particles having an average particle diameter of 8 nm.

Further, for example, if the core-shell type catalyst particles having an average particle diameter of 6 nm and the first kind of metallic nanoparticles having an average particle diameter of 2 nm are used, it is only necessary to add one-eleventh the amount of the first kind of metallic nanoparticles having an average particle diameter of 2 nm, with respect to the added amount of the core-shell type catalyst particles having an average particle diameter of 6 nm.

As described above, from the viewpoint of Ostwald ripening, the added amount effective for durability varies by the average particle diameter each of the core-shell type catalyst particles and the first kind of metallic nanoparticles.

3. Metallic Nanoparticles Having an Average Particle Diameter which is Larger than that of Core-Shell Type Catalyst Particles The metallic nanoparticles having an average particle diameter which is larger than that of the core-shell type catalyst particles mainly function to absorb the shell metallic material, which is eluted from the core-shell type catalyst particles, instead of the core-shell type catalyst particles, and precipitate thus absorbed shell metallic material on the surface to increase the particle diameter (hereinafter, such a metallic nanoparticle is referred to as the second kind of metallic nanoparticles).

As will be described in Examples, Ostwald ripening is considered by adding the second kind of metallic nanoparticles having an average particle diameter which is more than the average particle diameter of the core-shell type catalyst particles, so that the shell metallic material is more likely to be precipitated on the surface of the second kind of metallic nanoparticles than that of the core-shell type catalyst particles. Therefore, it is possible to prevent the precipitation of the shell metallic material on the core-shell type catalyst particles and thus to improve the durability of the core-shell type catalyst particles.

When the shell metallic material is platinum, at potential E, average particle diameter $R_1$ of the core-shell type catalyst particles and average particle diameter $R_3$ of the second kind of metallic nanoparticles can be determined so that reaction rate $r_1$ represented by the following formula (1) and reaction rate $r_3$ represented by the following formula (4) meet the relationship represented by the following formula (5).

$$r_1 = k_1 \theta_{vac} \left[ \exp\left\{ \frac{\alpha_{a,1} n_1 F}{RT}\left(E - U_1^\theta + \frac{\sigma_{Pt} M_{Pt}}{F \rho_{Pt}} \frac{1}{R_1}\right)\right\} - (C_{Pt^{2+}} \cdot 10^3)\exp\left\{ -\frac{\alpha_{c,1} n_1 F}{RT}\left(E - U_1^\theta + \frac{\sigma_{Pt} M_{Pt}}{F \rho_{Pt}} \frac{1}{R_1}\right)\right\} \right] \quad \text{Formula (1)}$$

$$r_3 = k_1 \theta_{vac} \left[ \exp\left\{ \frac{\alpha_{a,1} n_1 F}{RT}\left(E - U_1^\theta + \frac{\sigma_{Pt} M_{Pt}}{F \rho_{Pt}} \frac{1}{R_3}\right)\right\} - (C_{Pt^{2+}} \cdot 10^3)\exp\left\{ -\frac{\alpha_{c,1} n_1 F}{RT}\left(E - U_1^\theta + \frac{\sigma_{Pt} M_{Pt}}{F \rho_{Pt}} \frac{1}{R_3}\right)\right\} \right] \quad \text{Formula (4)}$$

$$r_1/r_3 < 1 \quad \text{Formula (5)}$$

wherein, in the Formulae (1) and (4), $k_1$, $\theta_{vac}$, $\alpha_{a,1}$, $n_1$, $F$, $R$, $T$, $E$, $U_1^\theta$, $\sigma_{Pt}$, $M_{Pt}$, $\rho_{Pt}$, $R_1$, $C_{Pt^{2+}}$ and $\alpha_{c,1}$ are as mentioned above; and $R_3$ represents an average particle diameter (cm) of the second kind of metallic nanoparticles.

The above Formula (1) is a formula regarding reaction rate $r_1$ of the core-shell type catalyst particles having an average particle diameter $R_1$. On the other hand, the above Formula (4) is a formula regarding reaction rate $r_3$ of the second kind of metallic nanoparticles having an average particle diameter $R_3$.

As will be described in Examples, the first term each in square brackets in the Formulae (1) and (4) can be a negligible value at an output point having a problem with the precipitation of the shell metallic material on the surface of the core-shell type catalyst particles, compared with the exponential function to base "e" in the second term. Therefore, both reaction rates $r_1$ and $r_3$ represented by the Formulae (1) and (4) can be negative values.

It is preferable that $r_1$ in the Formula (1) and $r_3$ in the Formula (4) meet the relationship of the above Formula (5), that is, the absolute value of precipitation rate $r_3$ of the second kind of metallic nanoparticles is larger than that of precipitation rate $r_1$ of the core-shell type catalyst particles, since the precipitation of the shell metallic material to the second kind of metallic nanoparticles proceeds more rapidly than that of the shell metallic material to the core-shell type catalyst particles.

The second kind of metallic nanoparticles preferably have a core-shell structure in which the shell metallic material is contained only in the surface of the particles. If platinum is used as the shell metallic material, it is particularly preferable that low-cost base metal oxides and polymer particles are used for the core portion of the second kind of metallic nanoparticles, and platinum metal is used for the shell portion of the second kind of metallic nanoparticles. It is not necessary for the second kind of metallic nanoparticles to be completely covered with the shell portion as long as the core portion of the particles is not eluted. Therefore, considering the cost, the second kind of metallic nanoparticles are preferably produced by a physical method such as a sputtering.

Examples of the base metal oxides include titanium oxide, manganese oxide and vanadium oxide. These base metal oxides are less likely to be eluted, so that it is suitable for using as the core portion.

Examples of the polymer particles include polyamide particles, polyethylene particles and polypropylene particles.

The shell portion of the second kind of metallic nanoparticles is preferably a monatomic layer.

From the results of Examples described below, the content of the second kind of metallic nanoparticles can be determined as described below. Hereinafter, there will be studied the case where the durability of the core-shell type catalyst particle is required to be doubled.

For example, if the core-shell type catalyst particles having an average particle diameter of 6 nm and the second kind of metallic nanoparticles having an average particle diameter of 20 nm are used, it is only necessary to add 1/2.3 the amount of the second kind of metallic nanoparticles having an average particle diameter of 20 nm, with respect to the added amount of the core-shell type catalyst particles having an average particle diameter of 6 nm.

On the other hand, for example, if the core-shell type catalyst particles having an average particle diameter of 8 nm and the second kind of metallic nanoparticles having an average particle diameter of 20 nm are used, it is only necessary to add 1/1.7 the amount of the second kind of metallic nanoparticles having an average particle diameter of 20 nm, with respect to the added amount of the core-shell type catalyst particles having an average particle diameter of 8 nm.

Further, for example, if the core-shell type catalyst particles having an average particle diameter of 10 nm and the second kind of metallic nanoparticles having an average particle diameter of 20 nm are used, it is only necessary to add 1/1.4 the amount of the second kind of metallic nanoparticles having an average particle diameter of 20 nm, with respect to the added amount of the core-shell type catalyst particles having an average particle diameter of 10 nm.

As described above, from the viewpoint of Ostwald ripening, the added amount effective for durability varies by the average particle diameter each of the core-shell type catalyst particles and the second kind of metallic nanoparticles.

It is particularly preferable that three kinds of particles including the core-shell type catalyst particles, the first kind of metallic nanoparticles and the second kind of metallic nanoparticles are used in combination. It is possible to inhibit the dissolution of the core-shell type catalyst particles by dissolving the first kind of metallic nanoparticles; while, it is possible to prevent an increase in a thickness of the shell portion of the core-shell type catalyst particles by precipitating the dissolved components of the first kind of metallic nanoparticles on the second kind of metallic nanoparticles. Accordingly, it is possible to balance durability with catalyst activity of the core-shell type catalyst particles.

In the case where the above-mentioned three kinds of particles are used in combination, it is preferable to prioritize the prevention of dissolution of the core-shell type catalyst particles over the prevention of precipitation to the core-shell type catalyst particles. Even if the shell metallic material is precipitated on the surface of the core-shell type catalyst particles, the core-shell type catalyst particles keep catalytic ability if the precipitation amount is small. However, if the core-shell type catalyst particles themselves are dissolved, catalytic ability disappears.

When the shell metallic material is platinum, at potential E, average particle diameter $R_1$ of the core-shell type catalyst particles and average particle diameter $R_2$ of the first kind of metallic nanoparticles can be determined so that reaction rate $r_1$ in the above Formula (1) and reaction rate $r_2$ in the above Formula (2) meet the relationship represented by the above Formula (3), and average particle diameter $R_1$ of the core-shell type catalyst particles and average particle diameter $R_3$ of the second kind of metallic nanoparticles can be determined so that reaction rate $r_1$ in the above Formula (1) and reaction rate $r_3$ in the above Formula (4) meet the relationship of the above Formula (5).

4. Other Constitutions of Fuel Cell

FIG. 1 is a view showing an example of the fuel cell of the present invention, and is also a view schematically showing a cross-section of the same in its layer stacking direction. Fuel cell 100 comprises membrane electrode assembly 8 which comprises hydrogen ion-conductive solid polymer electrolyte membrane (hereinafter may be simply referred to as electrolyte membrane) 1 and a pair of cathode electrode 6 and anode electrode 7 between which electrolyte membrane 1 is sandwiched; moreover, fuel cell 100 comprises a pair of separators 9 and 10 between which membrane electrode assembly 8 is sandwiched so that the electrodes are sandwiched from the outside. Gas channels 11 and 12 are each provided at the boundary of the separator and electrode. In general, as the electrode, one which comprises a catalyst layer and a gas diffusion layer stacked in this order from closest to the electrolyte membrane, is used. That is, cathode electrode 6 comprises a stack of cathode catalyst layer 2 and gas diffusion layer 4, while anode electrode 7 comprises a stack of anode catalyst layer 3 and gas diffusion layer 5.

The polymer electrolyte membrane is a polymer electrolyte membrane which is used in fuel cells, and there may be mentioned fluorinated polymer electrolyte membranes which comprise a fluorinated polymer electrolyte such as a perfluorocarbon sulfonic acid resin, as typified by Nafion (product name); moreover, for example, there may be mentioned hydrocarbon polymer electrolyte membranes which comprise a hydrocarbon polymer electrolyte in which a protonic acid group (proton conducting group) such as a sulfonic acid group, a carboxylic acid group, a phosphoric acid group or a boronic acid group is introduced into a hydrocarbon polymer such as an engineering plastic (e.g., polyether ether ketone, polyether ketone, polyethersulfone, polyphenylene sulfide, polyphenylene ether, polyparaphenylene) or a commodity plastic (e.g., polyethylene, polypropylene, polystyrene).

The polymer electrolyte membrane can comprise the above-mentioned first kind of metallic nanoparticles and/or second kind of metallic nanoparticles.

The electrode comprises the catalyst layer and the gas diffusion layer.

Both the anode catalyst layer and cathode catalyst layer can be formed by using a catalyst ink which comprises the above-mentioned core-shell type catalyst particles, an electroconductive material and a polymer electrolyte. The catalyst ink can comprise the above-mentioned first kind of metallic nanoparticles and/or second kind of metallic nanoparticles.

As the polymer electrolyte, materials that are the same as the above-mentioned materials for the polymer electrolyte membrane can be used.

As the electroconductive particle which is a catalyst carrier, electroconductive carbon materials including carbon particles such as carbon black and carbon fibers, and metallic materials such as metallic particles and metallic fibers can be used. The electroconductive material also functions as an electroconductive material which imparts electroconductivity to the catalyst layer.

A method for forming the catalyst layer is not particularly limited. For example, the catalyst layer can be formed on the surface of a gas diffusion layer sheet by applying the catalyst ink to the surface of the gas diffusion layer sheet and drying the same, or the catalyst layer can be formed on the surface of the electrolyte membrane by applying the catalyst ink to the surface of the electrolyte membrane and drying the same. Alternatively, the catalyst layer can be formed on the surface of the electrolyte membrane or of the gas diffusion layer sheet in such a manner that the catalyst ink is applied to the surface of a transfer substrate and dried to produce a transfer sheet; the transfer sheet is attached to the electrolyte membrane or the gas diffusion sheet by hot pressing or the like; thereafter, a substrate film is removed from the transfer sheet.

The catalyst ink can be obtained by dissolving or dispersing a catalyst and an electrolyte for electrodes as mentioned above in a solvent. The solvent of the catalyst ink can be appropriately selected, and the examples include alcohols such as methanol, ethanol and propanol, organic solvents such as N-methyl-2-pyrrolidone (NMP) and dimethyl sulfoxide (DMSO), mixtures of the organic solvents, and mixtures of the organic solvents and water. The catalyst ink can contain other components as needed, such as a binder and a water-repellent resin, besides the catalyst and the electrolyte.

A method for applying the catalyst ink, a method for drying the same, etc., can be appropriately selected. As the method for applying the catalyst ink, for example, there may be mentioned a spraying method, a screen printing method, a doctor blade method, a gravure printing method and a die-coating method. As the method for drying the same, for example, there may be mentioned drying under reduced pressure, heat drying and heat drying under reduced pressure. There is no limitation to the specific conditions for the drying under reduced pressure and the heat drying, so that they can be determined appropriately. The thickness of the catalyst layer is not particularly limited and can be about 1 to 50 µm.

As the gas diffusion layer sheet which forms the gas diffusion layer, there may be mentioned those having gas diffusivity which makes it possible to efficiently supply fuel to the catalyst layer, electroconductivity, and strength which is required for the material comprising the gas diffusion layer to have. The examples include those comprising electroconductive porous bodies including carbonaceous porous bodies such as carbon paper, carbon cloth and carbon felt, and metallic mesh or metallic porous bodies comprising metals such as titanium, aluminum, copper, nickel, nickel chrome alloys, copper, copper alloys, silver, aluminum alloys, zinc alloys, lead alloys, titanium, niobium, tantalum, iron, stainless steel, gold and platinum. The electroconductive porous body preferably has a thickness of about 50 to 500 µm.

The gas diffusion layer sheet can comprise the above-mentioned first kind of metallic nanoparticles and/or second kind of metallic nanoparticles.

The gas diffusion layer sheet can be formed of a single layer comprising the above-mentioned electroconductive porous body. Alternatively, the sheet can be such that a water-repellent layer is provided on a surface thereof which faces the catalyst layer. In general, the water-repellent layer has a porous structure which comprises, for example, electroconductive particles such as carbon particles or carbon fibers, and a water-repellent resin such as polytetrafluoroethylene (PTFE). The water-repellent layer is not always necessary; however, the water-repellent layer can increase the drainage properties of the gas diffusion layer while it can maintain the water content in the catalyst layer and the electrolyte membrane at an appropriate level; moreover, it is advantageous in improving the electrical contact between the catalyst layer and the gas diffusion layer.

The electrolyte membrane and the gas diffusion layer sheet at least one of which has the catalyst layer formed by the above method, are appropriately stacked and attached to each other by hot-pressing or the like, thereby obtaining a membrane electrode assembly.

The thus-produced membrane electrode assembly is further sandwiched between separators each of which preferably has a reaction gas channel, thereby forming a single fuel cell. As the separators, those that have electroconductive and gas sealing properties and can function as a collector and gas sealer can be used, such as carbon separators made of carbon/resin composites which contain a high concentration of carbon fibers, and metallic separators comprising metallic materials. Examples of the metallic separators include separators made of metallic materials having excellent corrosion-resistance and separators of which surface is coated with carbon or a metallic material having excellent corrosion resistance to increase the corrosion resistance. By performing compression molding or cutting work appropriately on such separators, the above-mentioned reaction gas channels can be formed.

The first kind of metallic nanoparticles and/or second kind of metallic nanoparticles can be contained in at least one of the polymer electrolyte membrane, the anode catalyst layer, the gas diffusion layer at the anode side, the cathode catalyst layer and the gas diffusion layer at the cathode side. If the core-shell type catalyst particles are contained only in the anode catalyst layer, the first kind of metallic nanoparticles and/or second kind of metallic nanoparticles are preferably contained in at least one of the polymer electrolyte membrane, the anode catalyst layer and the gas diffusion layer at the anode side. Also, if the core-shell type catalyst particles are contained only in the cathode catalyst layer, the first kind of metallic nanoparticles and/or second kind of metallic nanoparticles are preferably contained in at least one of the polymer electrolyte membrane, the cathode catalyst layer and the gas diffusion layer at the cathode side.

Examples

In Examples, the calculation of platinum particles having two different kinds of average particle diameters was performed based on a dissolution/precipitation equation (the following formula (6)), and the simulation for determining the contribution to the dissolution and precipitation of each of the particles was conducted. The details of a calculator and software are as follows.

Calculator: VersaPro VY16A/W-3 (product name; manufactured by: NEC Corporation)

Software: Advanced process modeling software (product name: gPROMS; manufactured by: PSE Japan)

$$r(i, z) = k_1 \theta_{vac}(i, z)$$

$$\left[\exp\left\{\frac{\alpha_{a,1} n_1 F}{RT}\left(E - U_1^\theta + \frac{\sigma_{Pt} M_{Pt}}{F \rho_{Pt}} \frac{1}{R_p}\right)\right\} - (C_{Pt^{2+}}(z) \cdot 10^3)\right.$$

$$\left.\exp\left\{-\frac{\alpha_{c,1} n_1 F}{RT}\left(E - U_1^\theta + \frac{\sigma_{Pt} M_{Pt}}{F \rho_{Pt}} \frac{1}{R_p}\right)\right\}\right] \quad \text{Formula (6)}$$

In Examples, the average particle diameter of platinum particles was defined as "$R_p$", and parameters in the above formula (6) were determined as mentioned below.

$k_1 = 3.4 \times 10^{-10}$ (mol·cm$^{-2}$·s$^{-1}$)
$\theta_{vac}(i,z) = 0$ (initial value)
$\alpha_{a,1} = 0.5$
$n_1 = 2$ (equiv.·mol$^{-1}$)
$F = 96485$ (C·equiv.$^{-1}$)
$R = 8.314$ (J·K$^{-1}$·mol$^{-1}$)
$T = 353$ (K)
$U_1^\theta = 1.188$ (V)
$\sigma_{Pt} = 2.37 \times 10^{-4}$ (J·cm$^{-2}$)
$M_{Pt} = 195$ (g·mol$^{-1}$)
$\rho_{Pt} = 21.95$ (g·cm$^{-3}$)
$C_{Pt^{2+}}(z) = 0$ (mol·L$^{-1}$) (initial value)
$\alpha_{c,1} = 0.5$ The following table 1 is a table which lists the dissolution rate and precipitation rate of platinum particles having a particle diameter of 2 to 40 nm at a potential of 1.0 V and 0.65 V. The dissolution rate refers to rate $r_a$ (i,z) calculated by the following formula (6a), and the precipitation rate refers to rate $r_b$ (i,z) calculated by the following formula (6b).

$$r_a(i, z) = \exp\left\{\frac{\alpha_{a,1} n_1 F}{RT}\left(E - U_1^\theta + \frac{\sigma_{Pt} M_{Pt}}{F \rho_{Pt}} \frac{1}{R_p}\right)\right\} \quad \text{Formula (6a)}$$

$$r_b(i, z) = \exp\left\{-\frac{\alpha_{c,1} n_1 F}{RT}\left(E - U_1^\theta + \frac{\sigma_{Pt} M_{Pt}}{F \rho_{Pt}} \frac{1}{R_p}\right)\right\} \quad \text{Formula (6b)}$$

TABLE 1

| Particle diameter R (nm) | Dissolution rate (E = 1.0 V) | Dissolution rate (E = 0.65 V) | Precipitation rate (E = 0.65 V) | Precipitation rate (E = 1.0 V) |
|---|---|---|---|---|
| 2  | 7.47E−02 | 7.52E−07 | 1.33E+06 | 1.34E+01 |
| 4  | 1.24E−02 | 1.25E−07 | 7.99E+06 | 8.04E+01 |
| 6  | 6.84E−03 | 6.88E−08 | 1.45E+07 | 1.46E+02 |
| 8  | 5.07E−03 | 5.11E−08 | 1.96E+07 | 1.97E+02 |
| 10 | 4.24E−03 | 4.27E−08 | 2.34E+07 | 2.36E+02 |
| 12 | 3.76E−03 | 3.79E−08 | 2.64E+07 | 2.66E+02 |
| 14 | 3.45E−03 | 3.48E−08 | 2.88E+07 | 2.90E+02 |
| 16 | 3.24E−03 | 3.26E−08 | 3.07E+07 | 3.09E+02 |
| 18 | 3.08E−03 | 3.10E−08 | 3.22E+07 | 3.24E+02 |
| 20 | 2.96E−03 | 2.98E−08 | 3.35E+07 | 3.38E+02 |
| 22 | 2.87E−03 | 2.89E−08 | 3.47E+07 | 3.49E+02 |
| 24 | 2.79E−03 | 2.81E−08 | 3.56E+07 | 3.58E+02 |
| 26 | 2.73E−03 | 2.74E−08 | 3.64E+07 | 3.67E+02 |
| 28 | 2.67E−03 | 2.69E−08 | 3.72E+07 | 3.74E+02 |
| 30 | 2.63E−03 | 2.65E−08 | 3.78E+07 | 3.81E+02 |
| 32 | 2.59E−03 | 2.61E−08 | 3.84E+07 | 3.86E+02 |
| 34 | 2.56E−03 | 2.57E−08 | 3.89E+07 | 3.91E+02 |
| 36 | 2.53E−03 | 2.54E−08 | 3.93E+07 | 3.96E+02 |
| 38 | 2.50E−03 | 2.52E−08 | 3.98E+07 | 4.00E+02 |
| 40 | 2.48E−03 | 2.49E−08 | 4.01E+07 | 4.04E+02 |

As shown in Table 1, it can be understood from the comparison of the dissolution rate at a potential of 1.0 V (that is, an open circuit voltage (hereinafter referred to as OCV)) and the dissolution rate at a potential of 0.65 V (that is, an output point) that the dissolution rate at OCV was about 10$^5$ times the dissolution rate at the output point. That is, the dissolution of platinum particles can be negligible at the output point.

On the other hand, it can be understood from the comparison of the precipitation rate at OCV and the precipitation rate at the output point that the precipitation rate at the output point was about 10$^5$ times the precipitation rate at OCV. That is, the precipitation of platinum particles can be negligible at OCV.

From the above calculation results, it can be understood that the precipitation of platinum particles can be mainly considered at the output point, and the dissolution of platinum particles can be mainly considered at OCV.

The following table 2 is a table which lists dissolution effects obtained when platinum particles having two different kinds of average particle diameters were mixed based on the calculation results of the dissolution rate at 1.0 V in the above table 1. The values calculated as follows are described in the following table 2. The values were calculated in such a manner that each of the calculation values of the platinum particles having an average particle diameter of 10 nm, 8 nm and 6 nm among the calculation values in the above table 1 was applied to each of the core-shell type catalyst particles having an average particle diameter of 10 nm, 8 nm and 6 nm; and the dissolution rate of each of the platinum particles having an average particle diameter of 2 to 40 nm was divided by the dissolution rate of each of the core-shell type catalyst particles. For example, it can be understood from the above table 1 that the dissolution rate of the core-shell type catalyst particles having an average particle diameter of 10 nm is 4.24×10$^{-3}$, and the dissolution rate of the platinum particles having an average particle diameter of 2 nm is 7.47×10$^{-2}$. Therefore, the ratio of the dissolution rate of the platinum particles having an average particle diameter of 2 nm to the dissolution rate of the core-shell type catalyst particles having an average particle diameter of 10 nm is 7.47×10$^{-2}$/4.24×10$^{-3}$=18. That is, it can be understood from the above ratio that the platinum particles having an average particle diameter of 2 nm is 18 times more likely to be dissolved than the core-shell type catalyst particles having an average particle diameter of 10 nm, at a potential of 1.0 V.

The higher the values described in Table 2, the higher the effect of preventing the destruction of the core-shell type catalyst particles upon addition of the same amount of the core-shell type catalyst particles and the platinum particles.

TABLE 2

| | Dissolution effect | | |
|---|---|---|---|
| Particle diameter R (nm) | 10 nm | 8 nm | 6 nm |
| 2  | 18 | 15 | 11 |
| 4  | 3  | 2  | 2  |
| 6  | 2  | 1  | 1  |
| 8  | 1  | 1  | 1  |
| 10 | 1  | 1  | 1  |
| 12 | 1  | 1  | 1  |
| 14 | 1  | 1  | 1  |
| 16 | 1  | 1  | 0  |
| 18 | 1  | 1  | 0  |
| 20 | 1  | 1  | 0  |
| 22 | 1  | 1  | 0  |
| 24 | 1  | 1  | 0  |
| 26 | 1  | 1  | 0  |
| 28 | 1  | 1  | 0  |
| 30 | 1  | 1  | 0  |
| 32 | 1  | 1  | 0  |
| 34 | 1  | 1  | 0  |
| 36 | 1  | 0  | 0  |

TABLE 2-continued

| | Dissolution effect | | |
|---|---|---|---|
| Particle diameter R (nm) | 10 nm | 8 nm | 6 nm |
| 38 | 1 | 0 | 0 |
| 40 | 1 | 0 | 0 |

The analysis as mentioned below is possible from the dissolution effects in the above table 2. For example, the dissolution rate of platinum particles having an average particle diameter of 2 nm is 18 times the dissolution rate of the core-shell type catalyst particles having an average particle diameter of 10 nm. Based on this result, it can be understood that the durability of the core-shell type catalyst particles having an average particle diameter of 10 nm is doubled by addition of one-eighteenth the amount of the platinum particles having an average particle diameter of 2 nm, with respect to the added amount of the core-shell type catalyst particles having an average particle diameter of 10 nm.

On the other hand, the dissolution rate of the platinum particles having an average particle diameter of 2 nm is 15 times the dissolution rate of the core-shell type catalyst particles having an average particle diameter of 8 nm. Based on this result, it can be understood that the durability of the core-shell type catalyst particles having an average particle diameter of 8 nm is doubled by addition of one-fifteenth the amount of the platinum particles having an average particle diameter of 2 nm, with respect to the added amount of the core-shell type catalyst particles having an average particle diameter of 8 nm.

In addition, the dissolution rate of the platinum particles having an average particle diameter of 2 nm is 11 times the dissolution rate of the core-shell type catalyst particles having an average particle diameter of 6 nm. Based on this result, it can be understood that the durability of the core-shell type catalyst particles having an average particle diameter of 6 nm is doubled by addition of one-eleventh the amount of the platinum particles having an average particle diameter of 2 nm, with respect to the added amount of the core-shell type catalyst particles having an average particle diameter of 6 nm.

From the dissolution effects in Table 2, it can be understood that the durability to the dissolution is not improved even by adding: the platinum particles having an average particle diameter of 8 nm or more if the core-shell type catalyst particles having an average particle diameter of 10 nm is added; or the platinum particles having an average particle diameter of 6 nm or more if the core-shell type catalyst particles having an average particle diameter of 8 nm or 6 nm is added. That is, the durability to the dissolution is not improved even by adding the platinum particles having an average particle diameter which is equal to or more than that of the core-shell type catalyst particles.

In addition, it can be understood that the larger the difference between the average particle diameter of the core-shell type catalyst particles and that of the platinum particles, the higher effect of the durability to the dissolution.

The following table 3 is a table which lists precipitation effects obtained when platinum particles having two different kinds of average particle diameters were mixed based on the calculation results of the precipitation rate at 0.65 V in the above table 1. The values calculated as follows are described in the following table 3. The values were calculated in such a manner that each of the calculation values of the platinum particles having an average particle diameter of 10 nm, 8 nm and 6 nm among the calculation values in the above table 1 was applied to each of the core-shell type catalyst particles having an average particle diameter of 10 nm, 8 nm and 6 nm; and the precipitation rate of each of the platinum particles having an average particle diameter of 2 to 40 nm was divided by the precipitation rate of each of the core-shell type catalyst particles. For example, it can be understood from the above table 1 that the precipitation rate of the core-shell type catalyst particles having an average particle diameter of 6 nm is $1.45 \times 10^7$, and the precipitation rate of the platinum particles having an average particle diameter of 20 nm is $3.35 \times 10^7$. Therefore, the ratio of the precipitation rate of the platinum particles having an average particle diameter of 20 nm to the precipitation rate of the core-shell type catalyst particles having an average particle diameter of 6 nm is $3.35 \times 10^7/1.45 \times 10^7 = 2.3$. That is, it can be understood from the comparison of the platinum particles having an average particle diameter of 20 nm and the core-shell type catalyst particles having an average particle diameter of 6 nm that platinum is 2.3 times more likely to be precipitated on the surface of the platinum particles than that of the core-shell type catalyst particles, at a potential of 0.65 V.

The higher the values described in Table 3, the higher the effect of preventing the increase in the thickness of the shell portion of the core-shell type catalyst particles upon addition of the same amount of the core-shell type catalyst particles and the platinum particles.

TABLE 3

| | Precipitation effect | | |
|---|---|---|---|
| Particle diameter (nm) | 10 nm | 8 nm | 6 nm |
| 2 | 0.1 | 0.1 | 0.1 |
| 4 | 0.3 | 0.4 | 0.6 |
| 6 | 0.6 | 0.7 | 1.0 |
| 8 | 0.8 | 1.0 | 1.4 |
| 10 | 1.0 | 1.2 | 1.6 |
| 12 | 1.1 | 1.3 | 1.8 |
| 14 | 1.2 | 1.5 | 2.0 |
| 16 | 1.3 | 1.6 | 2.1 |
| 18 | 1.4 | 1.6 | 2.2 |
| 20 | 1.4 | 1.7 | 2.3 |
| 22 | 1.5 | 1.8 | 2.4 |
| 24 | 1.5 | 1.8 | 2.5 |
| 26 | 1.6 | 1.9 | 2.5 |
| 28 | 1.6 | 1.9 | 2.6 |
| 30 | 1.6 | 1.9 | 2.6 |
| 32 | 1.6 | 2.0 | 2.6 |
| 34 | 1.7 | 2.0 | 2.7 |
| 36 | 1.7 | 2.0 | 2.7 |
| 38 | 1.7 | 2.0 | 2.7 |
| 40 | 1.7 | 2.0 | 2.8 |

The analysis as mentioned below is possible from the precipitation effects in the above table 3. For example, the precipitation rate of platinum particles having an average particle diameter of 20 nm is 2.3 times the precipitation rate of the core-shell type catalyst particles having an average particle diameter of 6 nm. Based on this result, it can be understood that the durability of the core-shell type catalyst particles having an average particle diameter of 6 nm is doubled by addition of 1/2.3 the amount of the platinum particles having an average particle diameter of 20 nm, with respect to the added amount of the core-shell type catalyst particles having an average particle diameter of 6 nm.

On the other hand, the precipitation rate of the platinum particles having an average particle diameter of 20 nm is 1.7 times the precipitation rate of the core-shell type catalyst particles having an average particle diameter of 8 nm. Based on this result, it can be understood that the durability of the core-shell type catalyst particles having an average particle diameter of 8 nm is doubled by addition of 1/1.7 the amount of the platinum particles having an average particle diameter of 20 nm, with respect to the added amount of the core-shell type catalyst particles having an average particle diameter of 8 nm.

In addition, the precipitation rate of the platinum particles having an average particle diameter of 20 nm is 1.4 times the precipitation rate of the core-shell type catalyst particles having an average particle diameter of 10 nm. Based on this result, it can be understood that the durability of the core-shell type catalyst particles having an average particle diameter of 10 nm is doubled by addition of 1/1.4 the amount of the platinum particles having an average particle diameter of 20 nm, with respect to the added amount of the core-shell type catalyst particles having an average particle diameter of 10 nm.

From the precipitation effects in Table 3, it can be understood that the durability to the precipitation is not improved even by adding: the platinum particles having an average particle diameter of 10 nm or less if the core-shell type catalyst particles having an average particle diameter of 10 nm is added; the platinum particles having an average particle diameter of 8 nm or less if the core-shell type catalyst particles having an average particle diameter of 8 nm is added; or the platinum particles having an average particle diameter of 6 nm or less if the core-shell type catalyst particles having an average particle diameter of 6 nm is added. That is, the durability to the precipitation is not improved even by adding the platinum particles having an average particle diameter which is equal to or less than that of the core-shell type catalyst particles.

In addition, it can be understood that the larger the difference between the average particle diameter of the core-shell type catalyst particles and that of the platinum particles, the higher effect of the durability to the precipitation.

However, the larger the average particle diameter of the platinum particles, the higher the cost together with the effect of the durability to the precipitation; therefore, the upper limit of the average particle diameter of the platinum particles which can be actually added varies by the platinum cost.

REFERENCE SIGNS LIST

1: Solid polymer electrolyte membrane
2: Cathode catalyst layer
3: Anode catalyst layer
4 and 5: Gas diffusion layer
6: Cathode electrode
7: Anode electrode
8: Membrane electrode assembly
9 and 10: Separator
11 and 12: Gas channel
100: Fuel cell

The invention claimed is:

1. A fuel cell comprising a single fuel cell that comprises a membrane electrode assembly comprising a polymer electrolyte membrane, an anode electrode on one surface of the polymer electrolyte membrane, and a cathode electrode on the other surface of the polymer electrolyte membrane, the anode electrode comprising an anode catalyst layer and a gas diffusion layer and the cathode electrode comprising a cathode catalyst layer and a gas diffusion layer, wherein at least one of the anode catalyst layer or the cathode catalyst layer comprises core-shell catalyst particles, each of which has a core portion and a shell portion completely covering the core portion and comprising a shell metallic material; and wherein at least one of the polymer electrolyte membrane, the anode catalyst layer, the gas diffusion layer at the anode side, the cathode catalyst layer or the gas diffusion layer at the cathode side comprises metallic nanoparticles having an average particle diameter that is different from that of the core-shell catalyst particles and comprises the shell metallic material.

2. The fuel cell according to claim 1, wherein the metallic nanoparticles have an average particle diameter which is smaller than that of the core-shell catalyst particles.

3. The fuel cell according to claim 1,
wherein the shell metallic material is platinum, and
wherein, at potential E, average particle diameter $R_1$ of the core-shell catalyst particles and average particle diameter $R_2$ of the metallic nanoparticles are determined so that reaction rate $r_1$ represented by the following formula (1) and reaction rate $r_2$ represented by the following formula (2) meet the relationship represented by the following formula (3):

$$r_1 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_1} \right) \right\} - (C_{Pt^{2+}} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_1} \right) \right\} \right] \quad \text{Formula (1)}$$

$$r_2 = k_1 \theta_{vac} \left[ \exp\left\{ \frac{\alpha_{a,1} n_1 F}{RT} \left( E - U_1^\theta + \frac{\sigma_{Pt} M_{Pt}}{F \rho_{Pt}} \frac{1}{R_2} \right) \right\} - (C_{Pt^{2+}} \cdot 10^3) \exp\left\{ -\frac{\alpha_{c,1} n_1 F}{RT} \left( E - U_1^\theta + \frac{\sigma_{Pt} M_{Pt}}{F \rho_{Pt}} \frac{1}{R_2} \right) \right\} \right] \quad \text{Formula (2)}$$

$$r_2/r_1 > 1 \quad \text{Formula (3)}$$

wherein, in the formulae (1) and (2),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_2$ is an average particle diameter (cm) of the metallic nanoparticles;
$C_{Pt^{2+}}$ is a platinum ion concentration (mol·L$^{-1}$); and
$\alpha_{c,1}$ is the transfer coefficient in reduction direction of a platinum dissolution reaction.

4. The fuel cell according to claim 1, wherein the metallic nanoparticles have an average particle diameter which is larger than that of the core-shell catalyst particles.

5. The fuel cell according to claim 4, wherein only the surface of the metallic nanoparticles comprises the shell metallic material.

6. The fuel cell according to claim 1,
wherein the shell metallic material is platinum, and
wherein, at potential E, average particle diameter $R_1$ of the core-shell catalyst particles and average particle diameter $R_3$ of the metallic nanoparticles are determined so that reaction rate $r_1$ represented by the following formula (1) and reaction rate $r_3$ represented by the following formula (4) meet the relationship represented by the following formula (5):

$$r_1 = k_1 \theta_{vac}\left[\exp\left\{\frac{\alpha_{a,1} n_1 F}{RT}\left(E - U_1^\theta + \frac{\sigma_{Pt} M_{Pt}}{F\rho_{Pt}}\frac{1}{R_1}\right)\right\} - (C_{Pt^{2+}} \cdot 10^3)\exp\left\{-\frac{\alpha_{c,1} n_1 F}{RT}\left(E - U_1^\theta + \frac{\sigma_{Pt} M_{Pt}}{F\rho_{Pt}}\frac{1}{R_1}\right)\right\}\right] \quad \text{Formula (1)}$$

$$r_3 = k_1 \theta_{vac}\left[\exp\left\{\frac{\alpha_{a,1} n_1 F}{RT}\left(E - U_1^\theta + \frac{\sigma_{Pt} M_{Pt}}{F\rho_{Pt}}\frac{1}{R_3}\right)\right\} - (C_{Pt^{2+}} \cdot 10^3)\exp\left\{-\frac{\alpha_{c,1} n_1 F}{RT}\left(E - U_1^\theta + \frac{\sigma_{Pt} M_{Pt}}{F\rho_{Pt}}\frac{1}{R_3}\right)\right\}\right] \quad \text{Formula (4)}$$

$$r_1/r_3 < 1 \quad \text{Formula (5)}$$

wherein, in the formulae (1) and (4),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_3$ is an average particle diameter (cm) of the metallic nanoparticles;
$C_{Pt^{2+}}$ is a platinum ion concentration (mol·L$^{-1}$); and
$\alpha_{c,1}$ is the transfer coefficient in reduction direction of a platinum dissolution reaction.

7. The fuel cell according to claim 1,
wherein the metallic nanoparticles are two or more kinds of metallic nanoparticles, and
wherein, among the different kinds of metallic nanoparticles, a first kind of metallic nanoparticles have an average particle diameter which is smaller than that of the core-shell catalyst particles, and a second kind of metallic nanoparticles have an average particle diameter which is larger than that of the core-shell catalyst particles.

8. The fuel cell according to claim 7, wherein only the surface of the metallic nanoparticles comprises the shell metallic material.

9. The fuel cell according to claim 7,
wherein the shell metallic material is platinum, and
wherein, at potential E, average particle diameter $R_1$ of the core-shell catalyst particles and average particle diameter $R_2$ of the first kind of metallic nanoparticles are determined so that reaction rate $r_1$ represented by the following formula (1) and reaction rate $r_2$ represented by the following formula (2) meet the relationship represented by the following formula (3), and average particle diameter $R_1$ of the core-shell catalyst particles and average particle diameter $R_3$ of the second kind of metallic nanoparticles are determined so that reaction rate $r_1$ represented by the following formula (1) and reaction rate $r_3$ represented by the following formula (4) meet the relationship represented by the following formula (5):

$$r_1 = k_1 \theta_{vac}\left[\exp\left\{\frac{\alpha_{a,1} n_1 F}{RT}\left(E - U_1^\theta + \frac{\sigma_{Pt} M_{Pt}}{F\rho_{Pt}}\frac{1}{R_1}\right)\right\} - (C_{Pt^{2+}} \cdot 10^3)\exp\left\{-\frac{\alpha_{c,1} n_1 F}{RT}\left(E - U_1^\theta + \frac{\sigma_{Pt} M_{Pt}}{F\rho_{Pt}}\frac{1}{R_1}\right)\right\}\right] \quad \text{Formula (1)}$$

$$r_2 = k_1 \theta_{vac}\left[\exp\left\{\frac{\alpha_{a,1} n_1 F}{RT}\left(E - U_1^\theta + \frac{\sigma_{Pt} M_{Pt}}{F\rho_{Pt}}\frac{1}{R_2}\right)\right\} - (C_{Pt^{2+}} \cdot 10^3)\exp\left\{-\frac{\alpha_{c,1} n_1 F}{RT}\left(E - U_1^\theta + \frac{\sigma_{Pt} M_{Pt}}{F\rho_{Pt}}\frac{1}{R_2}\right)\right\}\right] \quad \text{Formula (2)}$$

$$r_2/r_1 > 1 \quad \text{Formula (3)}$$

$$r_3 = k_1 \theta_{vac}\left[\exp\left\{\frac{\alpha_{a,1} n_1 F}{RT}\left(E - U_1^\theta + \frac{\sigma_{Pt} M_{Pt}}{F\rho_{Pt}}\frac{1}{R_3}\right)\right\} - (C_{Pt^{2+}} \cdot 10^3)\exp\left\{-\frac{\alpha_{c,1} n_1 F}{RT}\left(E - U_1^\theta + \frac{\sigma_{Pt} M_{Pt}}{F\rho_{Pt}}\frac{1}{R_3}\right)\right\}\right] \quad \text{Formula (4)}$$

$$r_1/r_3 < 1 \quad \text{Formula (5)}$$

wherein, in the formulae (1), (2) and (4),
$k_1$ is the rate constant (mol·cm$^{-2}$·s$^{-1}$) of a platinum dissolution reaction;
$\theta_{vac}$ is the ratio of a platinum surface which is not covered with oxide;
$\alpha_{a,1}$ is the transfer coefficient in oxidation direction of a platinum dissolution reaction;
$n_1$ is a number of electrons (equiv.·mol$^{-1}$) involved in a platinum dissolution reaction;
F is a Faraday constant (C·equiv.$^{-1}$);
R is a gas constant (J·K$^{-1}$·mol$^{-1}$);
T is a temperature (K);
E is a potential (V);
$U_1^\theta$ is the standard thermodynamic potential (V) of a platinum dissolution reaction;
$\sigma_{Pt}$ is the surface tension (J·cm$^{-2}$) of platinum particles;
$M_{Pt}$ is the mass of platinum atoms (g·mol$^{-1}$);
$\rho_{Pt}$ is a platinum density (g·cm$^{-3}$);
$R_1$ is an average particle diameter (cm) of the core-shell type catalyst particles;
$R_2$ is an average particle diameter (cm) of the first kind of metallic nanoparticles;
$R_3$ is an average particle diameter (cm) of the second kind of metallic nanoparticles;
$C_{Pt^{2+}}$ is a platinum ion concentration (mol·L$^{-1}$); and
$\alpha_{c,1}$ is the transfer coefficient in reduction direction of a platinum dissolution reaction.

* * * * *